Oct. 20, 1953  A. M. OLSON ET AL  2,656,033
APPARATUS FOR TURNING CONTAINERS
Filed Dec. 10, 1948  3 Sheets-Sheet 1
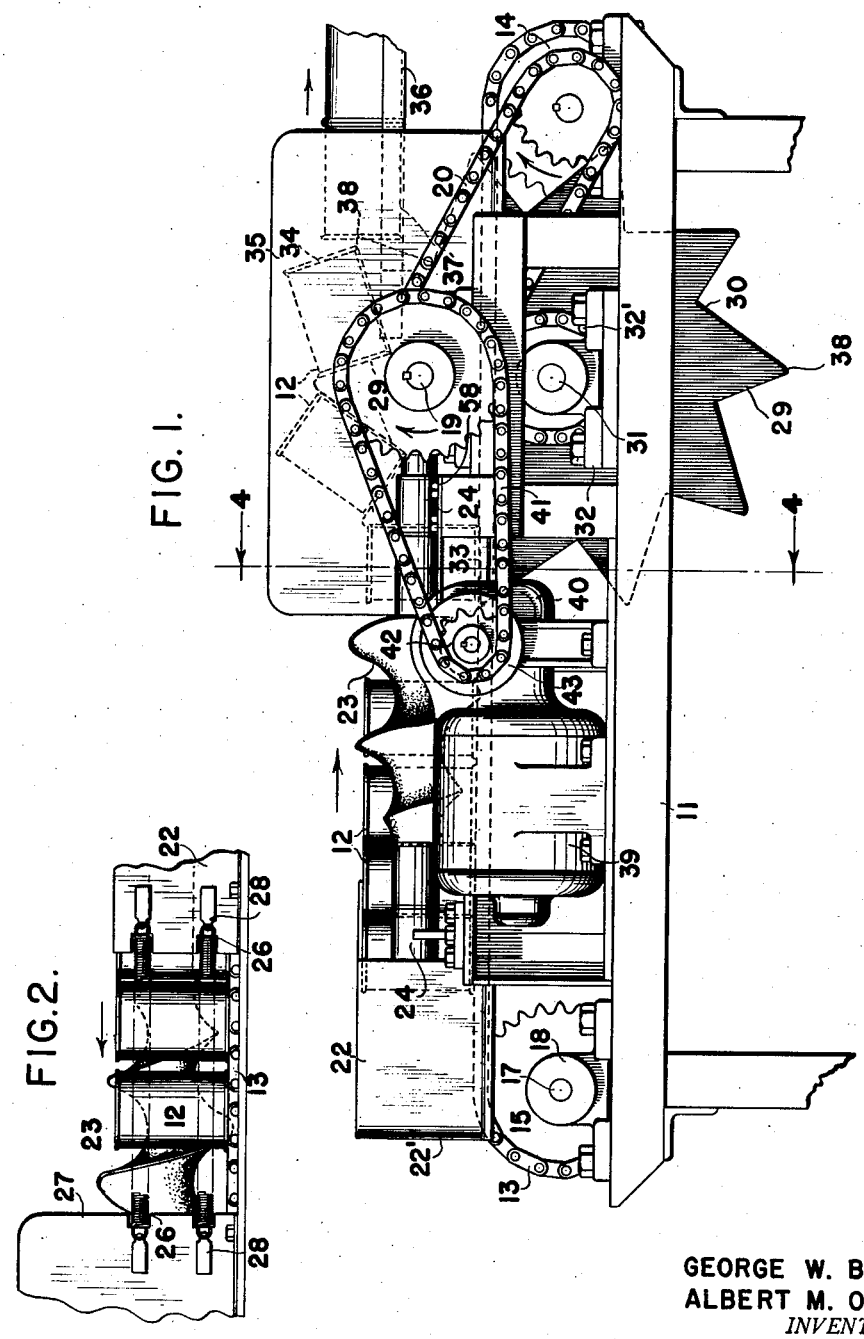
GEORGE W. BAKER
ALBERT M. OLSON
*INVENTOR.*
BY *George A. Evans*
ATTORNEY

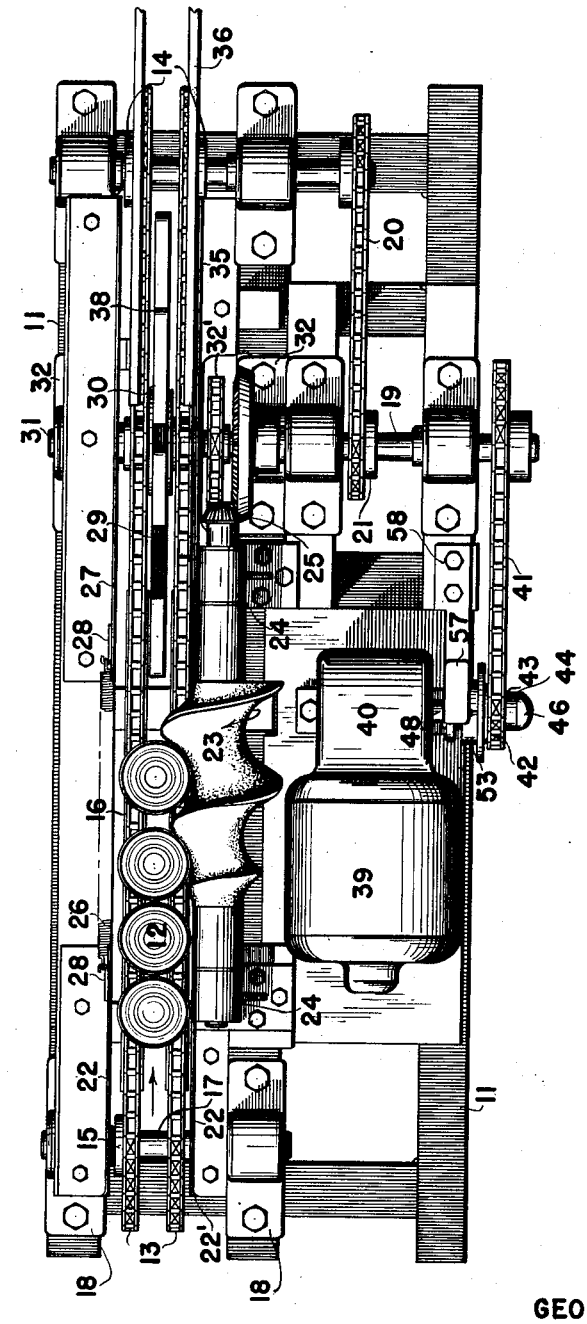

Oct. 20, 1953     A. M. OLSON ET AL     2,656,033
APPARATUS FOR TURNING CONTAINERS
Filed Dec. 10, 1948     3 Sheets-Sheet 3
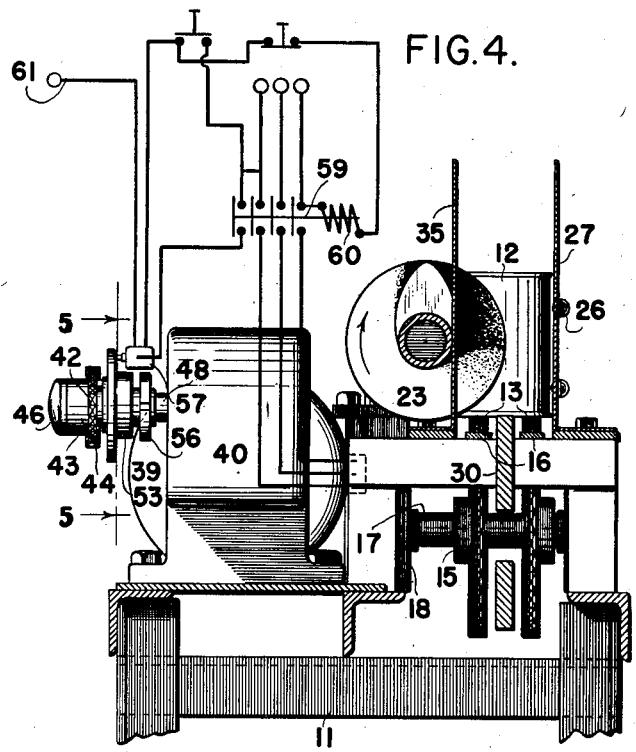
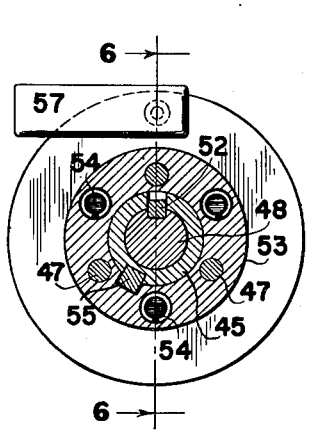
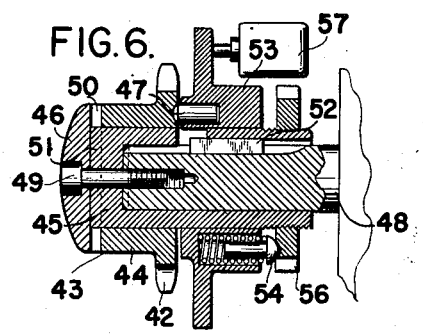
GEORGE W. BAKER
ALBERT M. OLSON
*INVENTOR.*
BY *George A. Evans*
        *ATTORNEY*

Patented Oct. 20, 1953

2,656,033

UNITED STATES PATENT OFFICE 2,656,033

APPARATUS FOR TURNING CONTAINERS

Albert M. Olson, Wauwatosa, and George W. Baker, Milwaukee, Wis., assignors to Chain Belt Company, Milwaukee, Wis., a corporation of Wisconsin Application December 10, 1948, Serial No. 64,566

3 Claims. (Cl. 198—33)

This invention relates to the art of handling containers and provides improved apparatus for altering the relative positions of the containers as they progress continuously through a plant on conveyer systems.

More specifically, the invention provides an improved mechanism for receiving containers while they are standing on end, with their axes vertical; and delivering them, lying on their sides, and with their axes horizontal and parallel to the direction of motion.

In the canning industry, as in all mass production industries, the emphasis is on speed of production. Recently, the canning industry has adopted high speed heating and cooling equipment which is capable of handling cans at a rate upwards of 300 per minute. An example of such an apparatus is disclosed in U. S. Patent No. 2,348,440, issued May 9, 1944, to Smith and Conley. This apparatus requires that the cans be presented to it lying on their sides in end-to-end relation with their axes aligned. Prior art devices for delivering cans in this axis-aligned position are not capable of delivering a continuous supply of cans at the rate required to fully utilize the capabilities of said Smith and Conley apparatus.

Accordingly, the principal object of this invention is to provide a machine that will turn cans, as aforesaid, at a rate upwards of 300 per minute.

The usual method for turning cans from upright to lying on their sides is to permit them to fall from the end of one conveyer to a conveyer on a lower level, similar to a waterfall. This system cannot operate any faster than gravity will attract the preceding can away from its successor. In falling, the cans are momentarily free and quite often they twist, resulting in a jam-up of the cans. Also, in falling to a conveyer on a lower level, the cans suffer a loss of altitude.

Another object of the present invention is to eliminate any free fall and to control positively the position of the cans at all times during the turning.

Another object of this invention is to deliver the cans without loss of horizontal level.

Another object of this invention is to provide an automatic cut-off of the drive if there should be a jam-up of cans anywhere within the apparatus or on the down-stream side of the apparatus.

Another object of the present invention is to turn the cans without abruptly changing their direction of motion, a feature which is necessary to avoid damaging the cans when they are handled at a high rate of speed.

According to the present invention, containers are fed continuously, in axis vertical position, to a helical spacing member. This spacing member operates in timed relation with a positively driven rotating wheel having pockets spaced around its circumference, and spaces the containers apart at intervals corresponding, in time, to the intervals between pockets on the wheel. The containers are then conveyed into the pockets on the wheel where they are moved under the influence of the wheel until they are in axis horizontal position, and are then ejected from the wheel in this position.

To prevent injury to containers, an overload clutch is provided to automatically shut off the machine if for any reason a jam should occur. This clutch protects against not only jams within the machine, but also jams on the down-stream side of the machine which make it impossible for the machine to eject containers.

In the accompanying drawings, which illustrate one embodiment of the invention:

Fig. 1 is a side elevation of the can turning device showing cans in various stages of progression through the machine;

Fig. 2 is a fragmentary view showing the spacing convolute and the springs used to keep cans in registry therewith;

Fig. 3 is a top plan view of the apparatus shown in Fig. 1;

Fig. 4 is a section taken on line 4—4 of Fig. 1, showing in addition, the wiring diagram for the starting, stopping and automatic shut-off device;

Fig. 5 is a vertical section through the clutch over-load device, taken on line 5—5 of Fig. 4;

Fig. 6 is a horizontal section taken on line 6—6 of Fig. 5.

Referring to the drawings, in Figs. 1 and 3 the apparatus embodying the present invention is shown as carried by a frame 11. Cans 12 are conveyed into the machine, from left to right in Fig. 1, on a parallel chain conveyer 13, which operates endlessly around head sprockets 14 and tail sprockets 15. The upper run of the chains 13 is supported through approximately the first half of the run by means of longitudinal chain guide elements 16, as best shown in Fig. 4, which give support to the conveyer against the weight of the cans. The tail sprockets are keyed to a shaft 17 which is journaled in bearings 18, which are in turn bolted to the frame 11. The holes in the frame through which the bolts extend are made oblong longitudinally of the frame so that the bearing assembly is adjustable to regulate the chain tension.

Power drive for the conveyer 13 is applied to the head sprockets 14 from an intermediate shaft 19 through a chain 20 and sprocket 21, keyed to the shaft 19.

Cans entering the machine riding on the conveyer 13 are standing on their ends with their axes vertical, as shown in Figs. 1 and 3. The means for feeding the cans to the conveyer 13 is not shown and forms no part of this invention. To provide lateral stability at the entrance to the apparatus, vertical guide panels 22 fixed to the frame 11 are provided. These guide panels are formed with rolled back leading edges 22', as shown in Figs. 1 and 3, so that cans will not be damaged if they are presented to the machine in transverse misalignment.

To space cans prior to entering the turning mechanism, which will be described later in detail, a helical spacing convolute 23, arranged longitudinally of the machine, is provided. As best seen in Fig. 3, cans moving through the apparatus from left to right are brought into registry with this convolute. The thread diameter of the convolute is tapered, having a progressively larger diameter in the direction of can travel. This taper causes the cans to be brought progressively into greater confinement under the influence of the convolute as they are moved past the convolute, and provides a safeguard against can damage at the point of first engagement with the convolute.

The convolute 23 is journaled in bearings 24 and is driven from the intermediate shaft 19 by means of bevel gears 25. (See Fig. 3.) Looking into the machine from the point of exit of the cans, as shown in Fig. 4, the convolute turns in a clockwise direction. Thus, the surface of the convolute moves downwardly against the can surfaces, encouraging the cans to ride stably on the conveyer 13.

In entering the spacing convolute 23, cans may momentarily ride upon the thread of the convolute. To prevent damage to the cans in this event, the yieldable guides 26 shown in Fig. 2 are provided. These yieldable guides consist of parallel coil springs, vertically spaced, and are arranged to extend from one of the vertical guide panels 22, previously mentioned, to a lateral guide plate 27. The yieldable guides 26 are attached at their extremities to the fixed guides 22 and 27 by means of hooks 28. As shown in Fig. 2, the fixed guides may be notched to make the yieldable guides active throughout their entire length.

It can be seen in Fig. 3 that the convolute thread pitch is such that only one can may be accommodated per pitch, so that one can emerges from the control of the convolute for each revolution. The thread contour may be altered from that shown if it is desired to accommodate objects of other than cylindrical configuration.

Cans leaving the spacing convolute 23 are conveyed by the conveyer 13 into pockets 29 on the periphery of a wheel 30, which is carried by a shaft 31 journaled in bearings 32. The wheel 30 is driven positively from the intermediate shaft 19 by means of a chain drive 32' and is located midway between the parallel chain conveyer 13, so that it is straddled by the individual chains of the conveyer.

It can be seen that the conveyer 13, spacing convolute 23 and wheel 30 are all driven from the intermediate shaft 19. This facilitates securing the proper relative motion of these parts, which is essential to successful operation of the machine. The intermediate shaft 19 is driven from motor 39 through gear reduction unit 40 and chain drive 41.

It may readily be seen by reference to Fig. 1, that cans must move into the pockets 29 at the instant that the faces of the pocket are horizontal and vertical. This is accomplished in the following manner. The conveyer 13 moves at a greater horizontal speed than does the advancing thread on the spacing convolute. This relative motion continually urges the cans forward against the thread of the spacing convolute 23, which acts to retard the forward motion of the can, and to release it at the proper instant so that when the pocket is in the aforesaid position the can will arrive there simultaneously. The thread on the spacing convolute will release a can just in advance of the time when each successive pocket 29 is rotated into can receiving position. A sufficient space is provided between the release end of the convolute and the wheel 30 to enable a can to completely clear the convolute before it comes under the influence of the wheel.

When the can enters the wheel pocket 29 its bottom end rests on the rearward face of the receiving pocket, designated 33 in Fig. 1. Rotation of the wheel 30 carries the can through an arc until this rearward pocket face occupies its discharge position designated 34. Lateral stability during this movement is provided by guide plates 27 and 35. When the can reaches the discharge position 34 it is engaged by the discharge receiving means, in this embodiment of the invention shown as horizontal rails 36, which are secured to the frame 11 by brackets, and arranged to straddle the wheel 30. As the wheel continues to rotate the can is ejected onto the rails as at 37, by the corner 38 between two pockets. As the next can is ejected, the can resting on the rails is pushed off onto other conveyer apparatus or into processing apparatus, whichever is desired, the form of the discharge receiving means being adapted accordingly.

It may be seen by reference to Fig. 1 that cans are turned from axis vertical position at 33 to axis horizontal position at 34 without any appreciable loss in horizontal elevation. It may also be seen that cans enter the pockets above the center of the shaft 31 and that the motion imparted to the can by the wheel 30 therefore has an appreciable forward component, obviating the can damage which would be caused by feeding cans to the wheel 30 at the horizontal level of its shaft 31, at which level the direction of motion of the can would be abruptly changed from forward to upward. This feature increases the capacity of the machine by making possible more rapid rotation of the wheel.

From the above, it is also apparent that the cans travel over a short arc compared to the circumference of the wheel 30, thereby minimizing the time that the cans are in the machine.

Referring to Fig. 1 and the foregoing description, it is seen that the cans are under positive control at all times while they are within the machine. There is, therefore, little danger of any jam-up of the cans within the machine. However, if apparatus on the downstream side of this invention should jam and cause a back-up of cans so that the can at 34 cannot be ejected, damage to said can would result, unless the operator stopped the machine in time. To provide an automatic shut-off for the machine, the elements shown in detail in Figs. 4, 5 and 6 are provided.

Referring first to Fig. 1, if the can at 34 cannot be ejected because of an obstruction, it exerts a backward reaction against the pocket 29 which is transmitted to the wheel 30 and its shaft 31. Because of the positive drive used throughout the machine, this reaction is transmitted through the driving elements to the motor sprocket 42.

It will be seen in Fig. 4 that this sprocket is an integral part of the clutch assembly, indicated generally by 43.

Figs. 5 and 6 show the details of the structure of this clutch assembly 43. It consists of the motor sprocket 42, which has a collar portion 44 journaled on a sleeve 45. The motor sprocket 42 is fixed laterally in one direction by a hub 46 and in the other direction by a plurality of radially spaced pins 47. The hub 46 is retained on the motor shaft 48 by a stud 49. The hub 46 is made to rotate integrally with the sleeve 45 by means of a groove 50 in the hub mating with a projection 51 on the end of the sleeve.

The sleeve 45 rotates integrally with the motor shaft 48, being fixed thereto by means of a key 52. A circular flanged member 53 contains the previously mentioned pins 47 and a second set of radially spaced, spring mounted pins 54. It is made to rotate with the shaft 48 and sleeve 45 by means of a key 55 (see Fig. 5) but is free to slide laterally along the sleeve 45.

The spring mounted pins 54 fit into matching detents on a disc member 56. This disc member 56 may be adjusted laterally on the sleeve 45 by means of the threads shown in Fig. 6. In operation, the disc member 56 is screwed toward the circular flanged member 53 until the pins 47 fit firmly into detents on the motor sprocket 42, this adjustment being maintained by the pressure of the spring mounted pins 54 in their detents. In this position the entire clutch assembly rotates integrally with the motor shaft 48. If a jam-up occurs in the machine, the motor sprocket is urged to stop, which rotates the motor sprocket 42 with respect to the circular flanged member 53 and the pins 47 are pulled from the detents in the motor sprocket 42. When this occurs, the circular flanged member 53 moves backward laterally toward the motor 39 against the pressure of the spring mounted pins 54. This motion actuates a switch 57 which is mounted by a bracket 58 on the frame 11.

Referring to the circuit diagram in Fig. 4, the current supply to the motor 39 is controlled by a magnetic switch 59. When the start button is pushed, a solenoid 60 is actuated, closing the magnetic switch 59. The button is then released and is normally open as shown in Fig. 4. If an overload occurs anywhere in the machine, the switch 57 is actuated as previously described. This switch is normally closed, so that actuating it causes it to open, thus opening the circuit to the solenoid 60 and thereby opening the magnetic switch 59. The machine may be stopped at any time by pressing the stop button, which also opens the circuit to the solenoid 60. To start the apparatus after the jam has been cleared, the start button is pushed and held in until rotation of the circular flanged member 53 reseats the pins 47 in their detents, which closes the switch 57 and causes the clutch assembly 43 to rotate as a unit and transmit power to the motor sprocket 42.

Normal operation having thus been resumed, the start button is released. The switch 57 may be of the multiple pole type, in which case it may be used to simultaneously shut off other apparatus in the plant. A second circuit 61 from this switch is indicated in Fig. 4.

From the foregoing description it is apparent that this invention provides a rapid and efficient machine for turning cans from axis vertical to axis horizontal position.

While, for convenience, the description has been written for a can turning device, it is to be understood that the principles of this invention apply equally to the turning of other objects.

We claim:

1. In apparatus for turning cylindrical containers from standing-on-end position to end-to-end position seriatim, the combination of power driven conveyer means feeding said containers continuously, a power driven convolute spacing said containers while they are fed by the conveyer means, yieldable means to hold the containers in registry with said spacing means, a power driven member containing pockets in its periphery of a shape to receive said containers from said conveyer and to turn them, said pockets containing said containers on two of the dimensions of said containers while turning them, means for driving all power driven means in timed relation so that said containers are moved into said pockets when the rearward face of each pocket is substantially horizontal, and means for interrupting said driving means responsive to a jam of containers in said apparatus.

2. Apparatus for turning objects from axis-parallel to axis-aligned position comprising a rotating member containing a plurality of pockets in its periphery arranged to turn the objects as aforesaid, a conveying member straddling said wheel for conveying the objects in axis-vertical position into the pockets, a spacing member to space apart objects on the conveying member at intervals corresponding to the interval between pockets on the wheel, and discharge receiving means separate from said conveying member for receiving said containers from the wheel in axis-aligned position.

3. Apparatus for turning seriatim containers standing on end and travelling with their axes in parallel relation to a position in which their axes are aligned and the containers rest on their sides comprising a conveyer on which the cams initially travel, a circular rotating member having a plurality of pockets disposed at regular intervals around its periphery arranged to lift the containers continuously seriatim from the conveyer, rotate them and deliver them on their sides, the rearward faces of said pockets being substantially horizontal when the objects are received and above the horizontal level of the center of the said rotating member and means operating in synchronism with the conveyer and the rotating member arranged to space the containers while on the conveyer and to time the feed of containers whereby each container reaches the end of its travel on the conveyer simultaneously with the arrival of a pocket of the rotating member in lifting position, said containers being retained in said pockets until the axes of the containers have turned from vertical to horizontal.

ALBERT M. OLSON.
GEORGE W. BAKER.

(References on following page)

References Cited in the file of this patent

UNITED STATES PATENTS

| Number | Name | Date |
|---|---|---|
| 931,434 | Krummel | Aug. 17, 1909 |
| 1,263,515 | Biehler | Apr. 23, 1918 |
| 1,355,184 | Taliaferro | Oct. 12, 1920 |
| 1,358,255 | Seufer | Nov. 9, 1920 |
| 1,567,153 | Kelly | Dec. 29, 1925 |
| 1,573,232 | Ekstrom | Feb. 16, 1926 |
| 1,649,267 | Tevander | Nov. 15, 1927 |
| 1,695,083 | Blackburne | Dec. 11, 1928 |
| 1,828,168 | Ayars | Oct. 20, 1931 |
| 1,880,243 | Dreher | Oct. 4, 1932 |
| 2,175,255 | Chapman | Oct. 10, 1939 |
| 2,538,408 | Baker | Jan. 16, 1951 |

FOREIGN PATENTS

| Number | Country | Date |
|---|---|---|
| 2,163 | Great Britain | May 27, 1880 |